United States Patent [19]

Mihalko

[11] Patent Number: 4,733,118

[45] Date of Patent: Mar. 22, 1988

[54] LOW DAMPING TORQUE BRUSHLESS D.C. MOTOR

[75] Inventor: Emil S. Mihalko, Lansdale, Pa.

[73] Assignee: HHK Inc., Plumsteadville, Pa.

[21] Appl. No.: 910,567

[22] Filed: Sep. 22, 1986

[51] Int. Cl.$^4$ .................. H02K 7/14; H02K 21/14
[52] U.S. Cl. ........................ 310/177; 310/47;
310/156; 310/208; 310/254
[58] Field of Search ............ 310/47, 50, 156, 177,
310/216, 208, 254; 318/254, 138

[56] References Cited

U.S. PATENT DOCUMENTS

| | | | |
|---|---|---|---|
| 3,935,909 | 2/1976 | Mabuchi et al. | 310/50 |
| 3,942,054 | 3/1976 | Kristen et al. | 310/179 |
| 4,130,769 | 12/1978 | Karube | 310/46 |
| 4,143,289 | 3/1979 | Williams | 310/156 |
| 4,336,475 | 6/1982 | Morinaga et al. | 310/198 |
| 4,385,248 | 5/1983 | Laskaris | 310/215 |
| 4,393,344 | 7/1983 | Whellams | 310/211 |
| 4,445,061 | 4/1984 | Jackson, Jr. | 310/154 |
| 4,463,276 | 7/1984 | Nakamuro | 310/266 |
| 4,547,713 | 10/1985 | Langley et al. | 310/68 R |
| 4,551,645 | 11/1985 | Takahashi et al. | 310/46 |
| 4,563,808 | 1/1986 | Lender | 29/596 |
| 4,645,961 | 2/1987 | Malsky | 310/156 |
| 4,692,631 | 9/1987 | Dahl | 310/156 |

Primary Examiner—Patrick R. Salce
Assistant Examiner—D. L. Rebsch
Attorney, Agent, or Firm—Woodcock Washburn Kurtz Mackiewicz & Norris

[57] ABSTRACT

A brushless D.C. motor, suitable for use as a hand-held surgical tool, includes a field of self-supporting coils arranged between a pair of impregnated fiberglass epoxy sheets situated in an air gap formed by a rotatable shaft having an even-number plurality of magnets formed thereon, and a non-electrically conductive housing. The individual magnets abut one another upon the shaft to prevent a magnetic return path from the substantially unidirectional field produced thereby, and are formed in relationship to the coils such that a single rotor pole will never be under a single coil, in order to minimize induced shorted currents.

22 Claims, 9 Drawing Figures

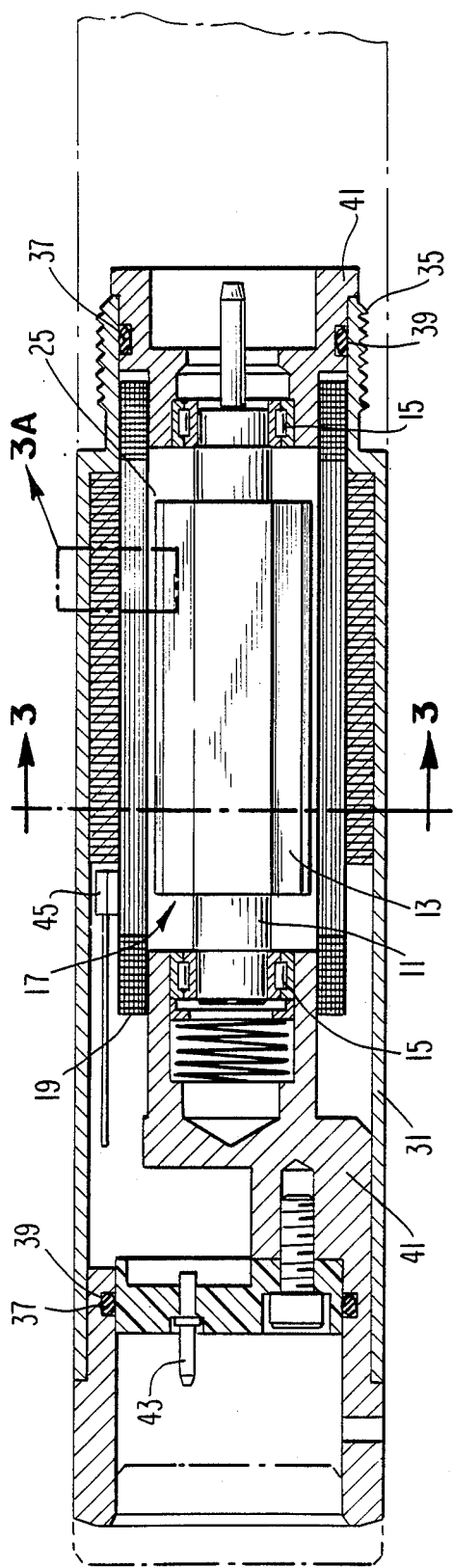
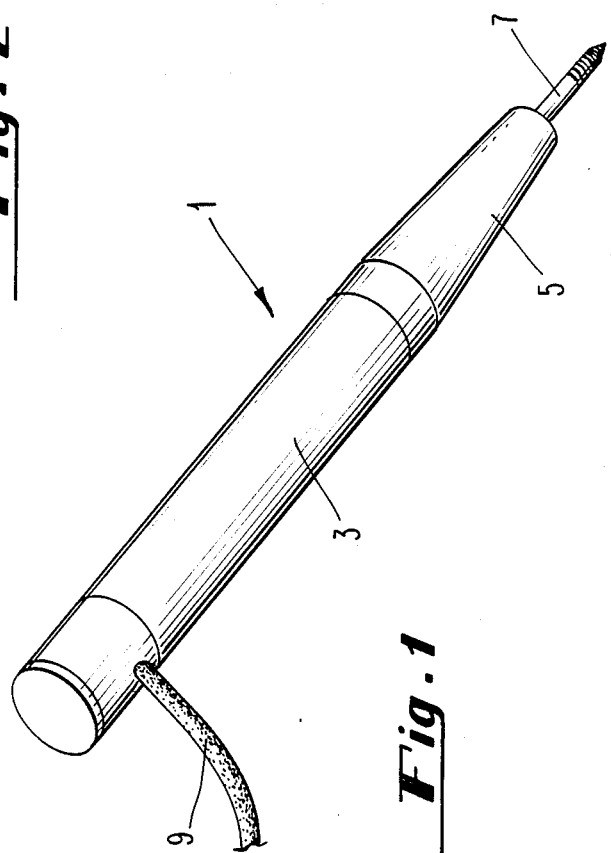

LOW DAMPING TORQUE BRUSHLESS D.C. MOTOR

BACKGROUND OF THE INVENTION

This invention is generally related to direct current (D.C.) motors, and more particularly to brushless D.C. motors which are capable of operating at extremely high speeds while maintaining a relatively low operating temperature.

The advantages that brushless D.C. motors have over conventional D.C. motors are well known. In brushless D.C. motors, it is usually most practical to provide a stator structure where the windings are placed in an external, slotted stator. The rotor consists of a shaft and a hub assembly with a magnetic structure. Such brushless D.C. motors produce their output torque via the interaction between a magnetic field produced by the permanent magnet rotor, and a magnetic field due to a D.C. current in the stator structure.

A conventional D.C. motor, on the other hand, is usually composed of permanent magnets which are situated in an outer stator structure and an inner rotor carrying the various winding coils. When compared with the typical brushless D.C. motor, it becomes evident that there are significant differences in winding and magnet locations. The conventional D.C. motor has the active conductors in the slots in the rotor structure, and in contrast, the brushless D.C. motor has the active conductors in slots in the outside stator. The removal of heat produced in the active windings is, thus, easier to accomplish in a brushless D.C. motor since the thermal path to the environment is shorter. Furthermore, since the permanent magnet rotor of a brushless motor does not contribute any heating in and of itself, the brushless D.C. motor is a more stable mechanical device than its conventional D.C. motor counterpart from a thermal point of view.

Brushless D.C. motors, just as conventional D.C. motors, are used to produce mechanical power from electric power. As such, both may be viewed as energy converters. Neither the brushless D.C. motor nor its conventional counterpart, however, are ideal converters due to various motor losses. Motor losses can generally be classified into two categories: (1) load sensitive losses which are dependent upon the generated torque; and (2) speed sensitive losses which are proportional to the motor's rotational speed.

The load or torque sensitive losses are generally limited to winding losses which are proportional to the square of the current going through the windings times the resistance of the windings. Motors are often wound with copper conductors, or in some of the newer low-inertia type motors, aluminum conductors. With either metal, however, electrical resistance increases with temperature, each at a different rate. Therefore, for a given value of current the winding losses will increase as a motor heats up.

Speed sensitive losses, such as core or iron losses due to eddy currents and hysteresis, windage and friction, short circuit currents, and brush contact, when combined together act as a velocity dependent torque which opposes the output torque of the motor. In brushless D.C. motors, brush contact losses are obviated as are friction losses between the brushes and commutator of a given conventional D.C. motor. Iron or core losses due to eddy currents and the hysteresis effect, as well as short circuit currents, remain as dominant losses even in brushless D.C. motors. As is well known, eddy currents are phenomena caused by a change of magnetic field through a medium that can also support a flow of electric current. In the case of a conventional permanent magnetic motor, the medium that experiences the change of magnetic field in which a potential voltage is induced is the iron of the armature. Likewise, the housing portion of a brushless D.C. motor also has a potential voltage induced in ts and produces currents called eddy currents. In either case, the induced eddy currents which are produced in the iron are proportional to speed, and can have a significant heating effect on the motor particularly when it operates at high speed.

Short circuit currents also contribute a component of loss which increases with motor speed. Motors which are not otherwise limited by their iron losses have speed limitations due to short circuit currents. Eddy currents, short circuit currents and hysteresis determine the maximum speed that may be obtained from conventional D.C. motors as well as brushless D.C. motors.

One prior art approach is disclosed in U.S. Pat. No. 4,130,769 Karube. Karube discloses a brushless D.C. motor having a rotor composed of a permanent field magnet, an armature coil body containing a plurality of polygonally-shaped coils with a given number of turns, and Hall effect sensors positioned in proximity to the end face of the magnet. The arrangement of the armature coil body and cylindrical permanent magnet, however, promotes two basic problems which would lead to heat caused by short circuit currents. First, the structure of the magnet yields an ill-defined magnetic field between adjacent poles. Separate and distinct magnets with alternating poles and a highly directional magnetic field would be more preferable to induce a sharp definition between the poles, and thus, promote a more distinct switching effect during commutation and minimize cogging. Second, the positioning of Hall effect sensors or any other commutation sensing means would more preferably be in the direction of the magnetic field, not as in Karube, perpendicular from the field where only flux leakage would be detected.

A second basic trend in the design of D.C. low inertia motors utilizes the moving coil concept. This principle basically consists of a multiple d'Arsonval movement with a commutation arrangement. Moving coil structures which are presently used have followed two general design paths, both of which have a multitude of conductors which move in a magnetic field, the armature structure being supported mainly by non-magnetic materials and the active conductors therefore moving in an air gap with a high magnetic flux density. Since the moving coil motor does not have moving iron in its magnetic field, neither iron eddy currents nor hysteresis effects are predominant as heat producing motor losses. Consequently, typical moving coil motors require lower power inputs to obtain high rotational speeds. One major problem with such moving coil or low-inertia motors, however, is that their armature-to-housing thermal resistance and housing-to-ambient thermal resistance are greatly different. For example, typical moving coil motors have thermal time constants of ranging from about 500 milliseconds and to about one second for armature-to-housing, and 30 to 60 minutes for housing-to-ambient. It is readily apparent that the armature of such moving coil motors could be heated to destructive temperatures in less than a minute without the motor's giving any warning because of its long thermal time constant between housing and ambient.

In order to prevent thermal destruction, therefore, air cooling is often provided for moving coil motors. Other forms of heat dissipation, such as cooling the motor with circulating water or oil, have also been employed. As is evident, the use of a moving coil low inertia motor which requires peripheral equipment to cool it would be cumbersome and more costly, especially in applications such as hand-held surgical tools which necessitate light weights and long-term heat dissipation capabilities. It would, therefore, be desirable to provide a brushless D.C. motor offering high efficiency and good commutation, while at the same time being capable of operating at high rotational speeds for extended periods of time without necessitating the use of forced air or other cooling techniques.

SUMMARY OF THE INVENTION

Accordingly, it is a general object of the present invention to provide a D.C. motor which requires a low power input to obtain high rotational speeds.

More particularly, it is an object of the present invention to provide a brushless D.C. motor having an improved efficiency factor while operating at greatly enhanced rotational speeds.

Another object of the present invention is to provide an improved brushless D.C. motor for applications such as surgical tools which necessitate an ability to withstand the high temperatures and humidity encountered in a sterilizing autoclave.

Yet another object of the present invention is to provide an improved brushless D.C. motor which is capable of operating at greatly enhanced rotational speeds without requiring peripheral cooling equipment.

Still another object of the present invention is to provide an improved brushless D.C. motor which is light weight, low-cost, and easy to fabricate.

These and other objects of the present invention are accomplished by a brushless D.C. motor which, instead of using stator lamination with the coils embedded in slots, uses a field of self-supporting coils arranged between a pair of impregnated fiberglass/epoxy sheets and situated in the air gap of the motor. A rotatable shaft having mounted thereon a plurality of permanent magnets is placed within the field, thereby producing a torque through the interaction of the magnetic field from the permanent magnet rotor and the magnetic field due to a D.C. current in the coils.

In accordance with one important aspect of the present invention, the magnets are formed of a material having a high coercive force ($H_c$), thus providing an essentially unidirectional magnetic field, and are affixed to the shaft in an abutting manner, thus eliminating exposure of the shaft to the field thereby minimizing secondary lines of force.

In accordance with another important aspect of the invention, a support stack of very thin insulated laminations surrounds the field of coils to provide a low eddy current return path and a magnetic return path. The laminations are preferably composed of an electrical iron having a low core loss at high frequencies. Since the coils are self-supporting and not embedded within a slotted stator, variations in torque and speed of the motor due to variations in the magnetic flux as the rotor poles move past the stator poles, sometimes known as "cogging", are eliminated.

In accordance with yet another important aspect of the invention each coil in the field is essentially polygonal in shape with two parallel sides arranged along the longitudinal axis of the motor. The coils are thus situated such that both sides of one coil cannot be exposed to the same rotor pole simultaneously. That is, the sides of one coil are either exposed to adjacent opposing poles or are completely unexposed.

In a presently preferred embodiment of the invention, the improved brushless D.C. motor is utilized within a hand-held surgical tool. Such applications require the use of lightweight materials which will dissipate heat while the motor is operating. Accordingly, in accordance with another important aspect of the invention, it is preferred that an ideal a housing which surrounds the motor be composed of any a material which has an infinite electrical resistance with a very high magnetic permeability. The housing may be composed of such material which is not electrically conductive, but a plastic housing is preferred since it minimizes the heating problems which were present in prior art brushless D.C. motors. Because the intensity of the magnetic field caused by the permanent magnetic rotor is on the order of 8000 oersteds, its effects are felt at distances outside of the field of coils, thereby inducing a potential across conductive materials. Since the field rotates faster at faster operational speeds, the potential induced at greatly enhanced rotational speeds is eliminated through the use of such a plastic housing.

Other objects, advantages, and novel features of the present invention will become apparent from the following detailed description of a preferred embodiment when considered in conjunction with the following drawings wherein:

BRIEF DESCRIPTION OF THE DRAWINGS

FIG. 1 illustrates a hand-held surgical tool utilizing the improved brushless D.C. motor of the present invention;

FIG. 2 is a cross-sectional view of the improved brushless D.C. motor utilized in the hand-held surgical tool shown in FIG. 1;

DETAILED DESCRIPTION OF THE PREFERRED EMBODIMENT

Figure 3:
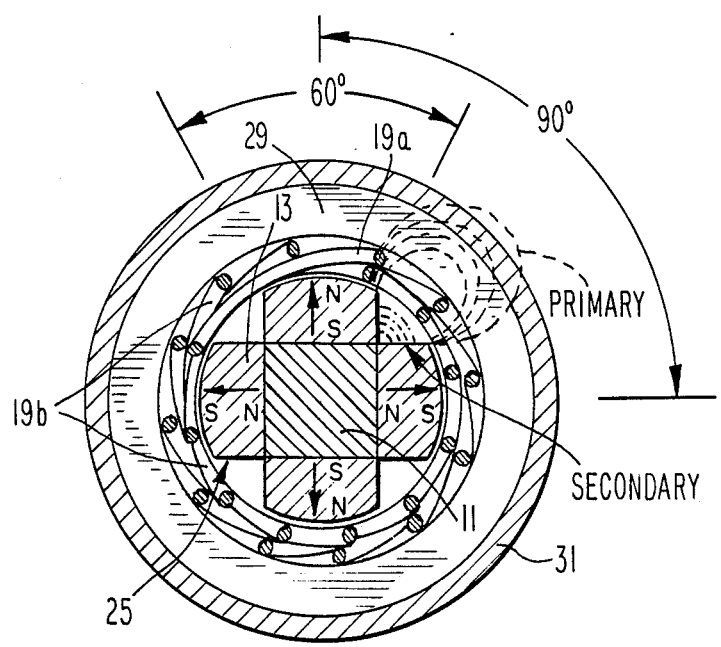
FIG. 3 is a cross-sectional view of the motor shown in FIG. 2 taken along the lines 3—3.

Referring now to the drawings, wherein like characters designate like or corresponding parts throughout the several views, there is shown in FIG. 1 a presently preferred application of the instant invention. A handheld tool 1, suitable for use in surgical applications, generally includes a motor portion 3 connected through an adaptor portion 5 to a work piece 7. The tool 1 receives its electrical power through a supply cord 9 attached at one end thereof.

As is shown more clearly in FIG. 2, the motor portion 3 includes a rotatable shaft 11 having a plurality of permanent magnets 13 radially mounted about its surface, the shaft 11 being supported between a pair of bearings 15. The magnets 13 preferably comprise a rare-earth material, and are glued to the shaft 11 with a suitable adhesive, such as a P2 resin and SB activator, manufactured by Columbus Adhesive & Chemical Company. The rotor 17 made up of the magnets 13 and the shaft 11 is then ground to a predetermined diameter suitable for use in a particular tool 1.

A plurality of coils 19, is self-supportedly mounted around the rotor 17 between a pair of pre-impregnated sheets 23 of a non-ferrous material such as fiberglass. As is shown more clearly in conjunction with FIGS. 3, 3A and 3B, the coils 19 are arranged within the air gap 25 of the motor portion 3, thus avoiding the use of stator lamination where the coils are typically embedded within slots as shown in FIG. 4, and reducing the inductance of the resultant assembly therefore by lowering its electrical time constant so that faster and more efficient switching of the drive current can be achieved by conventional electronic control means. It should be noted at this juncture that the term "air gap" as used herein refers to the "magnetic" air gap as opposed to the "mechanical" air gap. That is, as defined in the *IEEE Standard Dictionary of Electrical & Electronics Terms* (Second Edition), the term "air gap" refers to "separating space between two parts of magnetic material, the combination serving as a path for magnetic flux." Since the rare-earth magnets 13 used according to the present invention have a high coercive force which provides a substantially unidirectional field which extends well outside of the motor portion 3, the air gap 25 shown in FIGS. 3, 3A and 3B actually extends as far outside of the motor portion 3 as the path for the magnetic flux extends. This definition departs somewhat from the generally accepted "mechanical" air gap which ". . . is normally filled with air or hydrogen and represents clearance between rotor and stator of an electric machine."

In order to provide a low eddy current return path, as well as a magnetic return path, a support stack 27 for the coils 19 may be provided by a plurality of laminations 29. The laminations 29 are made up of electrical iron having a low core loss at high frequency, and are suitably from 0.006 inches to 0.007 inches thick. Typical prior art approaches which have utilized laminations require laminations on the order of 0.025 inches thick made of soft iron which has been annealed, thus raising its magnetic saturation point. Electrical iron, on the other hand, is critical to the practice of the instant invention because of the intensity of the magnetic field produced is so great (approximately 8000 oersteds) that it reaches out past the motor portion 3 and induces a potential across any conductive material.

Therefore, in accordance with one important aspect of this invention, the optimum material for a housing 31 which contains the motor portion 3 is one which has an infinite electrical resistance with a very high magnetic permeability. A ferrite material is such, but any material that is not electrically conductive is suitable for the housing 31. In a presently preferred embodiment of the instant invention, the housing 31 is made up of a plastic material such as a glass-filled, engineering grade plastic. Such materials should be thermally stable at high temperatures and have a low temperature coefficient of expansion, to permit its being sterilized in an autoclave.

Referring again to FIGS. 3A and 3B, it can be seen that the present invention may be practiced with or without the support stack 27. Stator laminations used in typical brushless D.C. motors are generally on the order of from 0.020 to 0.030 inches thick. However, in accordance with the embodiment of the present invention which utilizes the support stack 27 of very thin laminations 29 separated one from the other by an insulative oxide coat 33, thin laminations are used as one means of reducing eddy current losses at high frequencies of operation. That is, the laminations 29 are preferably from 0.006 to 0.007 inches thick, and separated by the insulative oxide coat 33, in order to reduce the total volume of iron exposed to the field into smaller incremental volumes which provide an increased resistance by laminating the iron.

Another means for reducing such eddy current losses, as has been discovered during the development of the present invention is to minimize the effects of the high-strength field induced by the rotating magnets 13 upon the housing 31. Conventional brushless D.C. motors utilize housings made of aluminum or steel, ostensibly to dissipate heat. In reality, such aluminum or steel housings are heat generators because the high-strength, rotating magnetic field produced by the magnets 13 induces a potential in the aluminum or steel housing which causes a current to flow in the housing which inturn results in heat.

One way which has been found to minimize the heat produced by the induced potential in the housing 31, is to make the housing 31 very thin (on the order of 0.020 inches) in cross-section in order to reduce its volume, and increase its resistance. As a result, the increased resistance minimizes the current which passes through the conductive aluminum housing. Ideally, however, the housing 31 may comprise an non-conductive material such as plastic, thus obviating the problem of a heat-producing current being induced by the rotating magnetic field.

Referring again to FIG. 3, the construction of the rotor 17 and its relationship to the geometry of the coils 19 will be explained. As shown by the dashed lines, a primary field exists across adjacent poles. A secondary field, indicated by dashed-and-dotted lines, also exists beneath the coils 19 where their lines of force do not intersect a conductive medium other than air. Thus, the secondary field will not induce work. The material selected for the magnets 13 is preferably one with a high coercive force ($H_c$) and an essentially unidirectional field (as indicated by the arrows). Rare-earth magnets are preferred, with one suitable such material being neodymium (e.g., NEIGT 27H). Furthermore, in accordance with a most important aspect of the present invention, the magnets 13 are affixed to the shaft 11 without exposing any portion of the shaft 11 to the primary or secondary fields. That is, a corner of one magnet 13 will abut the corner of its next adjacent magnet 13 to eliminate the path of least resistance for the magnetic field. While a four-pole rotor 17 is shown in FIG. 3, any even number of poles may be utilized such that the centerlines of adjacent magnets 13 are separated by 360/N degrees, N being an even number of total poles on the rotor 17.

In accordance with another most important aspect of the present invention, the outer arcuate surface of each magnet 13 ideally spans an arc equal to two-thirds of the arc between adjacent centerlines. For example, in the four-pole rotor 17 shown in FIG. 3, the centerline of each magnet 13 is ninety degrees from the next adjacent magnet 13. Therefore, the outer arcuate surface of each magnet 13 spans substantially sixty degrees.

Figure 3A:
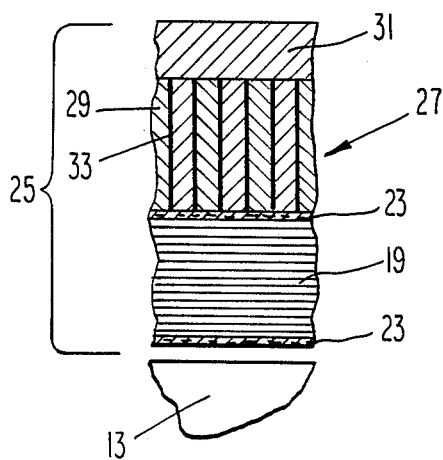
FIG. 3A is an enlarged portion of FIG. 2 showing details of a field coil-laminations-housing arrangement in accordance with one embodiment of the present invention.
Figure 3B:
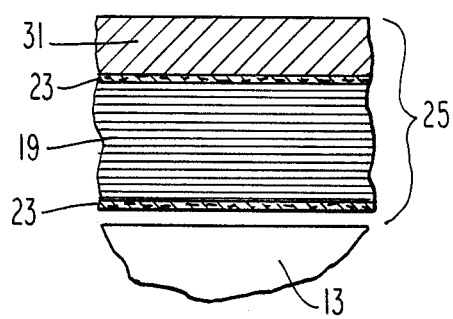
FIG. 3B shows details of another embodiment according to the present invention.
Figure 4:
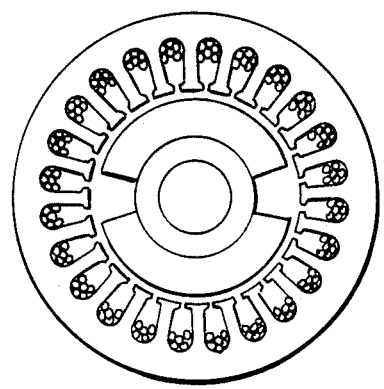
FIG. 4 is a cross-sectional view of a conventional brushless D.C. motor according to the prior art.
Figure 7:
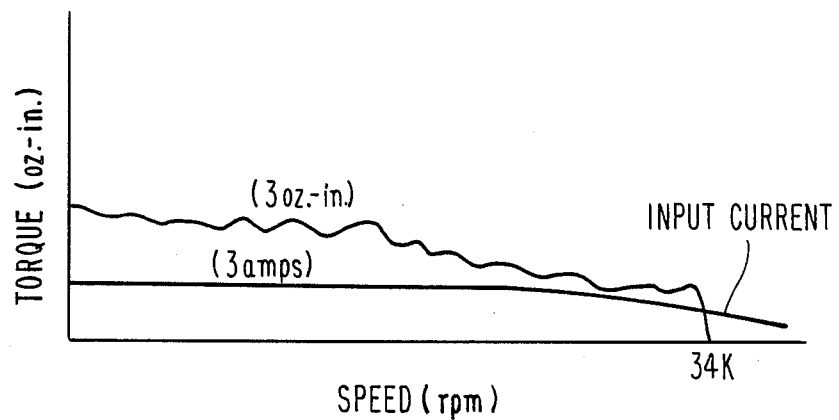
FIG. 7 illustrates the operating characteristics of a motor according to the present invention.

As also can be seen from FIG. 3, the width of each coil 19 is such that both sides thereof will not be exposed to the same pole at the same time. That is, the coil 19 is either exposed to adjacent poles (e.g., 19a), or is completely "off" the poles (e.g., 19b). This arrangement reduces the short circuit currents which would otherwise be generated if both sides of the coil were under one pole. One motor built in accordance with the present invention was capable of producing three ounce-inches of torque at speeds of between 40,000-70,000 rpm for periods of time in excess of ten minutes continuous operation without noticeable heat. The efficiency of that motor, as shown in FIG. 7 exceeded 90%, independent of dynamometer losses. This compares with typical prior art brushless D.C. motors having efficiencies of between 65% and 75%, maximum rotational speeds of approximately 10,000 rpm, and severely limited periods of continuous operation due to heat build-up.

Referring again to FIG. 2, it can be seen that the motor portion 3 is coupled to the adaptor portion 5 by threads 35 formed at one end of the motor portion 3. Since the preferred embodiment of the present may be suitably used as a surgical tool, thus requiring sterilization, a pair of O-rings 37 are provided within annular slots 39 formed upon respective bearing mounts 41. The assembled tool 1 is, thus, capable of withstanding the high humidity, high temperature (e.g., 270° F.) atmosphere of an autoclave.

Figure 5:
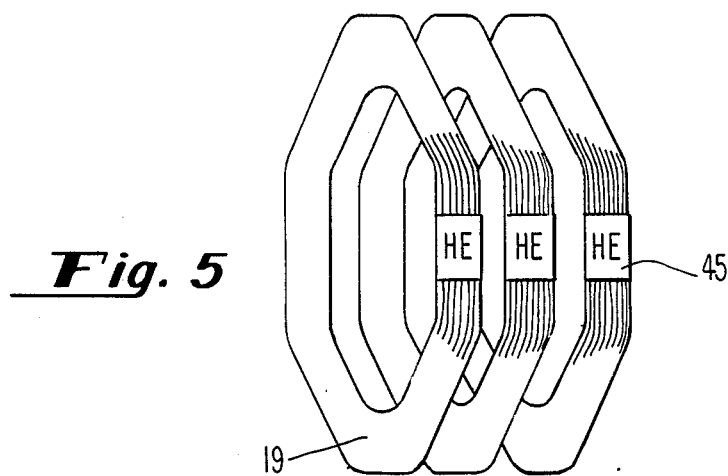
FIG. 5 illustrates the placement of commutation sensors.
Figure 6:
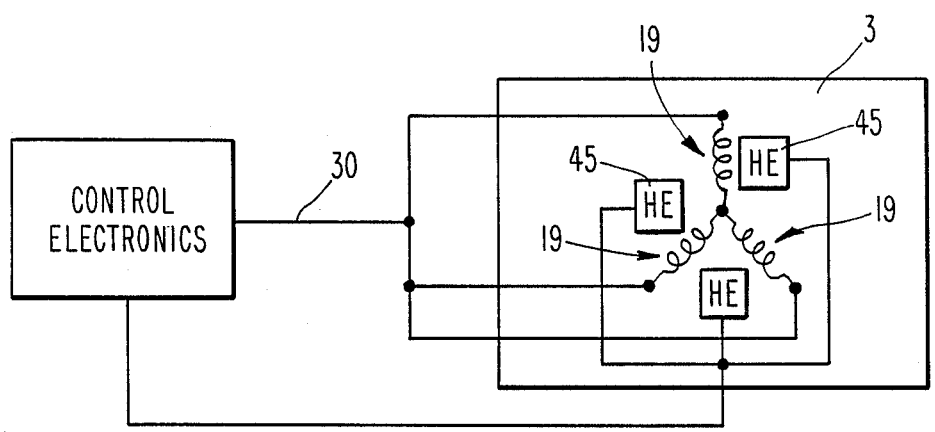
FIG. 6 is a simplified block diagram illustrating the control electronics.

A plurality of connector pins 43 are used to electrically connect the coils 19 and three conventional Hall effect sensors 45 (FIG. 5) for means of effecting a commutation of the motor portion 3. The Hall effect sensing system provided by the sensors 45, as is conventional, detects the magnitude and polarity of a magnetic field. The signals are then amplified and processed to form logic compatible levels for the conventional control electronics shown in FIG. 6. In typical brushless D.C. motors which utilize Hall effect sensors for commutation, the sensors are usually mounted in the stator structure where they sense the polarity and magnitude of the permanent magnetic field in the air gap. The outputs of these sensors control the logic functions of the controller configuration to provide current to the proper coil in the stator. One drawback with such a location for the Hall effect sensors is that they become subject to high stator temperature conditions which may affect the Hall effect switching performance, therefore becoming a system performance limitation. However, since the motor portion 3 of the present invention significantly reduces the operational temperatures experienced by the coils 19, the Hall effect sensors 45 in accordance with yet another important aspect of the invention are located directed upon the coils 19 as shown in FIG. 5. Also, the highly focussed magnetic field produced by magnets 13 enable a clean, crisp commutation output. This commutation is an important advantage over the present diffused magnetic fields which create a sloping waveform thereby making it more difficult for the controller to analyze.

It is apparent from the foregoing that an improved brushless D.C. motor is provided by the present invention in which a self-supporting field of coils 19 are situated about a rotor 17 composed of a plurality of magnets 13 affixed to a rotatable shaft 11, thus resulting in a lower electrical time constant so that faster and more efficient switching of the current driving the coils 19 can be achieved by a conventional controller and drive unit. Because in one embodiment the support stack 27 is composed of very thin laminations 29 separated by an insulative oxide coat 33, or in accordance with the preferred embodiment of the present invention where a very thin, conductive or non-conductive or plastic housing is employed, the overall inductance of the motor portion 3, is reduced. Furthermore, a low eddy current return path and magnetic return path is provided, thereby reducing eddy current losses and their resultant heat. Because the conventional stator slots are eliminated by arranging the coils 19 in a self-supporting fashion in the air gap of the motor portion 3 no cogging or preferred position is experienced. That is, variations in torque and speed of the motor portion 3 since variations in the magnetic flux caused when the poles of the rotor 17 move past the stator poles are eliminated.

Obviously many modifications and variations of the present invention are possible in light of the above teachings. It is therefore to be understood that within the scope of the appended claims, the invention may be practiced otherwise than as specifically described.

What is claimed is:

1. An improved brushless D.C. motor, comprising:
    a rotor including a plurality of permanent magnets radially spaced apart affixed to a rotatable shaft, each said magnet having a coercive force capable of providing a substantially unidirectional field, a longitudinal centerline, an outer arcuate surface, and an inner surface between a pair of corners;
    a plurality of coils formed in a cylindrical array about said rotor each said coil comprising electrical conductors formed in a polygonal array having a predetermined number of turns and including at least two parallel sides with respective centerlines spaced by a predetermined distance approximately equal to said outer arcuate surface, and being substantially perpendicular to said magnetic field, said parallel sides each having a width substantially the same as but no greater than the space between adjacent magnets;
    commutation sensing means mounted contiguously upon preselected ones of said plurality of coils for detecting the magnitude and polarity of said magnetic field produced by said permanent magnets;
    a housing surrounding said plurality of coils with said commutation sensing means and said rotor; and
    control means coupled to said plurality of coils and said commutation sensing means for providing power thereto and commutating said rotor.

2. The motor according to claim 1, wherein said plurality of permanent magnets comprises an even-numbered plurality.

3. The motor according to claim 2, wherein said plurality of magnets affixed to said rotatable shaft are separated each from the other 360/N mechanical degrees between their respective centerlines, N being the even number of magnets.

4. The motor according to claim 3, wherein said outer arcuate surface spans an angle comprising substantially two-thirds of the separation between each of said magnets.

5. The motor according to claim 4, wherein the corner of each of said magnets contiguously adjoins the corners of its next adjacent magnet.

6. The motor according to claim 1, wherein said magnets comprise rare-earth magnets.

7. The motor according to claim 6, wherein said rare-earth magnets comprise Neodymium magnets.

8. The improved brushless D.C. motor according to claim 1, wherein said housing comprises a non-conductive housing.

9. The improved brushless D.C. motor according to claim 1, further comprising:
   a support stack including a plurality of thin laminations separated each from the other by an insulative coat.

10. The improved brushless D.C. motor according to claim 1, wherein said plurality of coils are bonded between a pair of fiberglass sheets by an epoxy resin.

11. The improved brushless D.C. motor according to claim 1, wherein said housing comprises a thin, conductive housing.

12. The improved brushless D.C. motor according to claim 8 wherein said non-conductive housing comprises a ferrite material.

13. The improved brushless D.C. motor according to claim 8, wherein said non-conductive housing comprises a plastic.

14. A hand-held surgical tool, comprising:
   a motor portion including a brushless D.C. motor comprising:
   a rotor including an even plurality of permanent magnets radially spaced apart affixed to a rotatable shaft separated each from the other 360/N mechanical degrees between their respective centerlines where N is the number of magnets, each said magnet having a coercive force capable of producing a substantially unidirectional field;
   a plurality of coils formed in a cylindrical array about said rotor, each said coil comprising electrical conductors formed in a polygonal array having a predetermined number of turns and including at least two sides parallel with said shaft with their respective centerlines spaced by a predetermined distance, and being substantially perpendicular to said magnetic field;
   commutation sensing means mounted contiguously upon preselected ones of said plurality of coils for detecting the magnitude and polarity of a magnetic field produced by said permanent magnets;
   a housing surrounding said plurality of coils with said commutation sensing means and said rotor;
   an adaptor portion coupled to said motor portion for transmitting a torque supplied by said shaft; and
   a workpiece coupled to said adaptor portion, said workpiece being adapted to rotate with said torque by said shaft.

15. The tool according to claim 14, further comprising:
   a support stack including a plurality of thin laminations separated each from the other by an insulative coat.

16. The tool according to claim 15, wherein said laminations comprise electrical-grade steel.

17. The tool according to claim 16, wherein said laminations are each from 0.006 to 0.007 inches thick.

18. The tool according to claim 14, wherein said plurality of said coils is bonded between a pair of fiberglass sheets by an epoxy resin.

19. The tool according to claim 14, wherein said housing comprises a thin, conductive housing.

20. The tool according to claim 14, wherein said housing comprises a non-conductive housing.

21. The tool according to claim 20, wherein said non-conductive housing comprises a ferrite material.

22. The tool according to claim 20, wherein said non-conductive housing comprises a plastic.

* * * * *